June 8, 1926.
C. G. H. ANDERSON
ELECTRICAL REGULATOR
Filed June 29, 1923
1,588,155
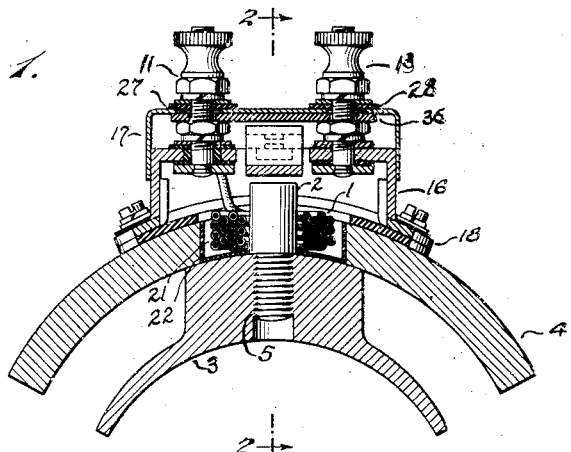
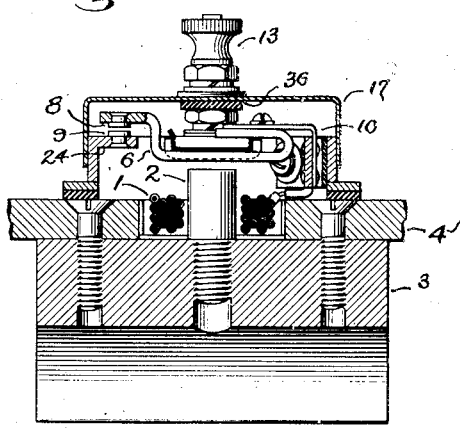
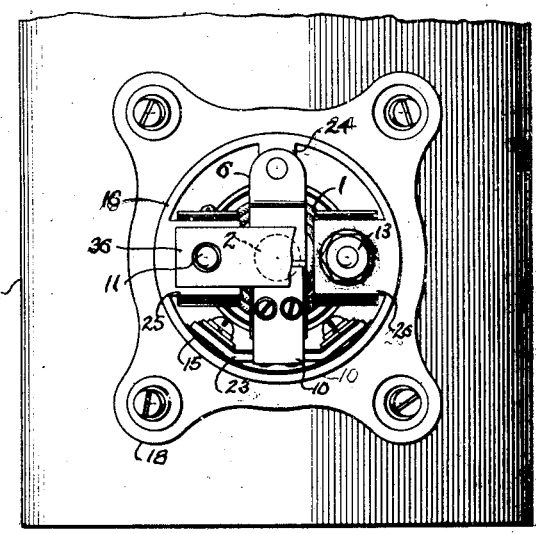
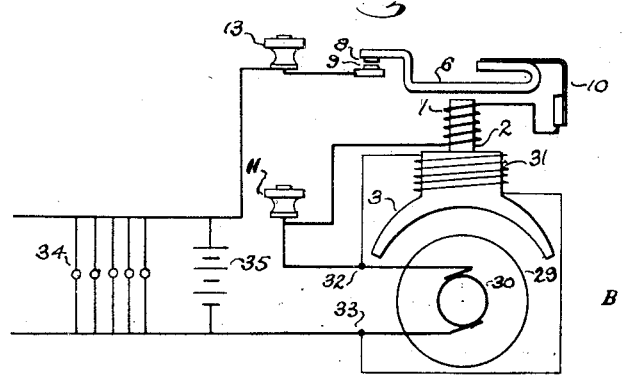
Carl G. Harry Anderson
INVENTOR
BY William A. Hughes
ATTORNEY Patented June 8, 1926.

1,588,155

UNITED STATES PATENT OFFICE.

CARL G. HARRY ANDERSON, OF ST. LOUIS, MISSOURI.

ELECTRICAL REGULATOR.

Application filed June 29, 1923. Serial No. 648,473.

My invention relates to regulators for direct current generators, and is generally applicable to regulators for opening and closing the circuit between a direct current dynamo and another source of current in accordance with the change in relation between the amounts of current delivered by the two sources. Particularly my invention relates to regulators for the electric generators of gasolene motor cars.

The embodiment of my invention as shown in the drawing comprises a relay in which a contact making armature is acted upon both by the flux from one of the shunt field windings of a generator and by the flux from an auxiliary series coil wound upon a stub extension of the pole-piece of said field coil. The main current passing through the series coil, connection is made from one side of it to one of the generator terminals. Connection is made from the other side of the series coil through the relay armature to one of the supply mains. The other supply main is connected to the other terminal of the generator. The load and storage battery of the system are connected across the supply mains.

The purpose of my invention is to provide means for closing the circuit between a generator and a storage battery which is connected across the load of said generator when the voltage of the generator is great enough to cause a flow of current from the generator into the circuit between the generator and the battery.

Another object of my invention is to provide means for opening the circuit between the generator and battery when the voltage of the generator is lower than that of the battery, to prevent the battery from discharging through the generator.

Referring to the accompanying drawings Fig. 1 shows a vertical mid-section of my device mounted on the pole-piece of a generator, the pole-piece and a part of the generator frame also being shown in section. The section is taken in a plane perpendicular to the axis of the shaft of the generator. Fig. 2 shows a vertical mid-section taken in a plane along the axis of the generator shaft. Fig. 3 is a plan view of the same embodiment of my invention with the casing cover of it left off. Fig. 4 is a diagrammatic view of my invention with its connections to the other pairs of the electrical system.

In the drawings part 1 is a series coil of a few turns of comparatively heavy wire set in the opening 21 of the generator frame 4 over the pole-piece 3. The sides and bottom of the cavity are lined with insulation 22. Screwed into the threaded hole 5 in the pole-piece is the stub extension 2 which extends within the coil 1 and into proximity with the relay or cutout armature 6. Armature 6 is attached to the casing 16 by means of the spring 10 and the strap 23. The strap 23 is mechanically fixed to the casing 16 but is electrically insulated therefrom by means of the insulating strip 15 and by sleeves and washers at the point of fastening. The casing 16 is brazed or otherwise fixed to the flange plate 18 or it may be made integral therewith, the flange 18 being fixed and insulated from the generator frame 4 in some suitable manner. On the horizontal inward extension 24 from the upper rim of the casing 16 is fixed the electrical contact making point 9 over which registers the contact point 8 fixed to the armature 6. The two binding posts 11 and 13 are mounted on the inward extensions 25 and 26 respectively, the post 11 being insulated from extension 25 and post 13 making electrical contact with extension 26 and therefore to casing 16. The insulating strip 36 is slipped over the posts 11 and 13 and serves to insulate the casing cap 17 from the relay mechanism. The holes 27 and 28 in the casing cap are made large enough to avoid contact between the cap 17 and the screws 11 and 13.

Fig. 4 of the drawing shows a diagrammatic representation of my invention as connected to a shunt generator and its load, together with a storage battery for carrying the load when the generator is not running. Herein is shown diagrammatically the armature 29 and commutator 30 of the generator. The field 31 of a comparatively large number of turns of comparatively small wire is connected in shunt with the armature 29. On the pole-piece 3 is shown the stud extension 2 around which is assembled the relay winding 1 wound in the same direction as the shunt coil 31 and which consists of a few turns of comparatively large wire. The coil 1 is connected on one side to the generator terminal 32 and on the other to the spring 10 of the relay. Electrical connection is continued through the relay armature 6 by way of the make and break contact points 8 and 9 through to the relay terminal 13 to one side of the supply mains and the load 34. The other generator terminal 33 is connected directly through the other side of the supply mains to the other side of the load. The storage battery 35 is connected in shunt with the load.

The operation of my device is as follows. Upon the starting of the generator there is sufficient leakage of flux through the pole-piece 3 and the stud 2 to actuate the relay armature 6 and close the normally open contacts 8 and 9. The line switches being closed the generator current will now flow through the supply mains, the relay, and the load, and the flux produced by the series coil 1 will hold the relay closed. The shunt field 31 and the series coil 1 being wound in the same direction their respective fluxes will be in the same direction when current is passing in the normal direction through the coil 1. However, under other conditions as when the speed of the generator is decreased so that its resistance is lower than that of the battery 35 current will momentarily flow from the battery to the generator. But this current flow will produce a magnetic flux about the coil 1 which will buck that of coil 31 and neutralize it thereby releasing armature 6 which is then moved by spring 10 to open the circuit at contacts 8 and 9. Thus the discharge of the battery through the generator is prevented and the battery having no source of current to oppose it will automatically take the load and supply current to it.

Other embodiments of my invention may be made which employ the same principles as the one above explained, change being made as regards the form of the mechanism herein disclosed, provided that the means or parts stated by any of the following claims or the equivalent of such stated means or parts be employed.

I claim:

1. In combination with a direct current generator connected to a load across which is connected an electric battery of a polarity opposed to the normal polarity of the generator, an extension of a pole-piece of said generator in the magnetic field of the pole-piece, a coil about said extension and connected in series with said load, a relay armature in operative relation to said extension, contact points carried by said armature and electrically in series with said coil and said load, and a spring tending to move said armature to open said contact points.

2. In combination with a direct current generator having shunt field windings and connected to a load across which is connected a storage battery of a polarity opposed to the normal polarity of the generator, an extension of a pole-piece of said generator in the magnetic field of the pole-piece, a coil about said extension whose windings are in the same direction as those of said shunt windings and which is connected in series with said load, a relay armature in magnetic relation to said extension, contact points movable by said armature and electrical connection with said coil and load, and a spring tending to move said armature to break the connection through said contact points.

3. In an electric generator having a shunt field, in combination, a load for said generator, a stud extension of a pole-piece of said generator, a winding on said stud with turns in the same direction as those of said shunt field, connection from said generator to said load including said winding in series with the armature of the generator and load, an armature in magnetic relation to said stud, contacts carried by said armature and electrically in series with said winding, and a spring tending to move said armature to break the connection through said contacts.

4. In combination in an electrical generator, a magnetic field frame, pole-pieces on said frame, an armature, shunt field coils on said pole-pieces, a stud extension of one of the pole-pieces and in the magnetic field thereof on said frame, a winding on said stud connected in series with said armature and the load of said generator, said winding being magnetically wound in the same direction as the said shunt field coils, make and break contacts in the circuit of said load, a relay armature controlling said contacts, said relay being in magnetic relation to said stud, and a spring tending to keep said contacts open.

5. In combination with a direct current generator having shunt field windings and an opening in the magnetic frame thereof over one of its shunt field pole pieces, a magnetic stud extension on said pole piece in said opening and spaced from said generator frame, a coil in said opening and about said stud connected in series with the armature and load of said generator and wound magnetically in the same direction as said shunt field, a relay armature in magnetic relation to said stud, contacts carried by said relay armature and electrically in series with said coil, and a spring tending to move said relay armature to break the connection through said contacts.

6. In an electric generator having a shunt field, in combination, a magnetizable stud extension of a pole-piece of said generator, a winding on said stud with turns in the same direction as those of said shunt field, connection from said generator to said winding in series with the armature of the generator, an armature in magnetic relation to said stud, contacts carried by said armature and electrically in series with said winding, and a spring tending to move said armature to break the connection through said contacts.

7. In combination with an electric generator, a magnetic field frame, pole-pieces on said frame, an armature, windings on said pole-pieces, a stud magnetizable extension for one of said pole-pieces composed of magnetizable metal, a winding on said stud mounted in a depression in said frame and connected in series with said armature and the load leads of said generator, said windings being mounted in the same magnetic sense as the windings of the field poles, contacts in the circuit of said load leads, a relay armature controlling said contacts, said relay being in magnetic relation to said stud, and a spring tending to keep said contacts open.

8. In combination with a direct current generator having field poles and field windings and connected to a load across which is connected a storage battery of polarity opposed to the normal polarity of the generator, a magnetizable stud extension for one of the pole pieces, a winding placing about said extension wound in the same direction as the adjacent field winding and mounted substantially within the confines of the shell portion of the generator frame, said winding being connected in series with the load, a relay armature in magnetic relation to said stud extension, contact points movable by said armature and making electrical connection between said winding and load, and a spring tending to move said armature to break the connection through said contact points.

9. In combination with a direct current generator having field poles and field windings and connected to a load across which is connected a storage battery of polarity opposed to the normal polarity of the generator a magnetizable stud extension on one of the pole pieces, a winding placed about said extension wound in the same direction as the adjacent field winding and mounted substantially within the confines of the shell portion of the generator frame, said winding being connected in series with the load, a relay armature in magnetic relation to said stud extension, contact points movable by said armature and making electrical connection between said winding and load, and a spring tending to move said armature to break the connection through said contact points arranged symmetrically to the center line of flux direction of said pole-pieces.

10. In combination with a direct current generator having shunt field windings and openings in the frame thereof over one of its pole-pieces, a stud extension on said pole-pieces projecting into said hole, a coil wound around said stud in the same magnetic sense as the winding on the adjacent field pole and connected in series between the armature and load leads of said generator, an armature in magnetic relation to said stud, contacts carried by said relay armature adapted to disconnect said generator from said load, and a spring tending to retract the armature so as to keep said contacts open.

Signed at St. Louis, State of Missouri, this 18th day of June A. D. 1923.

CARL G. HARRY ANDERSON.